United States Patent

[11] 3,577,076

[72] Inventors James E. Frushour
Endwell;
Earnest H. Millham, Apalachin; James E.
Ortloff, Harpursville, N.Y.
[21] Appl. No. 757,715
[22] Filed Sept. 5, 1968
[45] Patented May 4, 1971
[73] Assignee International Business Machines
Corporation
Armonk, N.Y.

[54] AUTOMATIC RANGE SCALE SELECTION
APPARATUS FOR A MEASURING DEVICE
5 Claims, 5 Drawing Figs.
[52] U.S. Cl. .................................................. 324/115,
324/68
[51] Int. Cl. ...................................................... G01r 15/08,
G04f 9/00
[50] Field of Search .......................................... 324/115,
103, 68 (A), 68 (C); 328/116; 73/197, 517

[56] References Cited
UNITED STATES PATENTS
| 2,541,039 | 2/1951 | Cole .............................. | 324/103X |
| 2,824,297 | 2/1958 | Josias et al. ................... | 324/115X |
| 2,207,908 | 7/1940 | Beecher ........................ | 73/197 |
| 3,176,518 | 4/1965 | Morris et al. .................. | 73/517X |
| 3,410,138 | 11/1968 | Lynch ........................... | 73/197 |

Primary Examiner—Rudolph V. Rolinec
Assistant Examiner—Ernest F. Karlsen
Attorneys—Hanifin and Jancin and Kenneth P. Johnson ABSTRACT: Apparatus for automatically selecting the proper scale in a measuring instrument wherein a transducer or sensor is provided for each required scale and all respond concurrently by producing an electrical analog output signal at various rates proportional to the input condition or property. A selection circuit compares the output levels with sensor limits and thereafter connects the output signal of the highest nonsaturated sensor with an analog-to-digital converter or indicating means.

INVENTORS
JAMES E. FRUSHOUR
ERNEST H. MILLHAM
JAMES E. ORTLOFF

BY K. P. Johnson
ATTORNEY

AUTOMATIC RANGE SCALE SELECTION APPARATUS FOR A MEASURING DEVICE

BACKGROUND OF THE INVENTION

In making measurements of environmental conditions, physical properties, component characteristics, elapsed time and the like, the value is often expressed as an analog electrical signal from the measuring device, such as a sensor or transducer. An analog-to-digital (A to D) converter may then produce the digital equivalent of the analog signal to provide the data in a more convenient form for observation or computer processing.

An automated arrangement of obtaining the measurement data is highly desirable when numerous readings are required, for example, during testing or quality inspection. One of the problems encountered in automating the process is that of selecting the best scale from which the output data can be taken. As a result, several apparatuses have been designed that automatically select the proper scale for maximum accuracy.

These apparatuses still have the disadvantage of being relatively slow because of the physical internal switching that occurs as the measuring instrument compares signal magnitude and the capacity of a scale, then changes to the next scale. The magnitude of the input signal may also vary widely from one measurement to the next so that the most appropriate scale cannot be approximated or preselected. This cautious sensing and switching is, of course, required to protect the usually expensive measuring instruments.

In some instances it is required to measure the magnitude of some function which occurs as a single incident. The function is converted, if necessary, to an analog electrical signal for reconversion by an analog-to-digital converter. However, the time duration of the single incident may not be sufficient to allow the A-to-D converter to automatically select the best range. Further, the time duration may be less than the conversion time of the A-to-D converter. By providing more than one input sensor, each with a different range capability, and each having an analog storage capability, it is possible to effect an A-to-D conversion on an appropriate scale which otherwise would be outside of the converter capabilities.

Although a single sensor could be arranged to store the analog level for a time period sufficient to allow slow A-to-D ranging and conversion, the provision of more than one sensor allows each sensor to be optimized for its particular range. This increases the accuracy of the final results.

In the attainment of the foregoing objects, this invention provides a plurality of condition sensing devices arranged to respond concurrently at different rates proportional to a common input condition such as time, temperature, pressure, etc. The resulting sensor output signals are then compared simultaneously with reference voltages representing saturation or nonlinear signal levels and the output signals of those sensors exceeding the respective saturation levels are switched off. The comparator output signals and switching circuits are used to control circuit logic so that, as a sensor for one scale reaches its saturation region, the sensor output signal for the next higher scale is then coupled to an analog-to-digital converter. The circuit logic is effective to also indicate the scale presently being converted. In the event that all sensors are saturated, an indication is so made.

The scale selection arrangement of the invention advantageously requires but a single analog-to-digital converter. It further generates the various sensor output signals concurrently so that the largest nonsaturated signal can be readily coupled to the converter instead of the usual practice of starting with a sensor signal, then comparing the capacity of successively smaller scales with the sensor signal until the appropriate scale is found. In addition, the circuit lends itself to the use of solid-state switching devices which further enhance the performance and response.

The foregoing and other objects, features and advantages of the invention will be apparent from the following more particular description of a preferred embodiment of the invention as illustrated in the accompanying drawings wherein.

In the following description, the scale selection apparatus will be described as used in conjunction with apparatus for determining the elapsed time for the signal delay characteristic of an electrical circuit. The condition sensor used in this application produces an output analog signal whose amplitude increases with increasing delay of signal transmission through the circuit being observed.

It is to be kept in mind that the scale selection apparatus can readily be connected for operation with other conventional sensors or transducers which respond to a changing parameter of an input signal. Examples of such devices are magnetic displacement transducers, crystal pressure transducers, thermocouples, etc.

Figure 1:
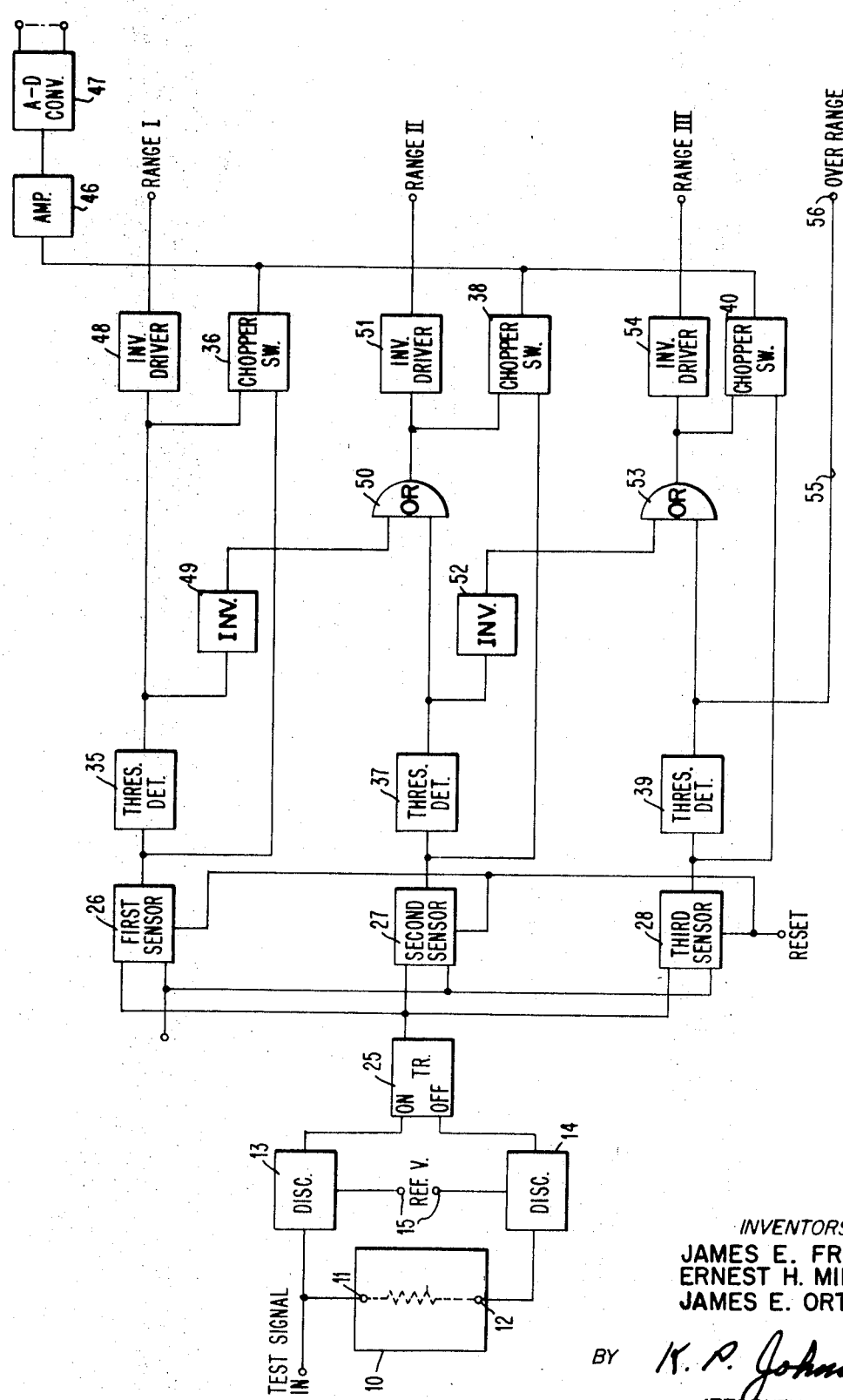
FIG. 1 is a schematic block diagram of an automatic scale selection apparatus constructed in accordance with the invention.

Referring to FIG. 1, a substrate 10 has an electrical circuit thereon connected between an input terminal 11 and an output terminal 12 for which the delay in signal propagation is to be determined. A test pulse is initiated at the input terminal by any suitable means. Connected to each of the input and output terminals is a voltage discriminator 13, 14 which generates an output signal when the test pulse voltage crosses the discriminator threshold set by a reference voltage at terminals 15.

Figure 2:
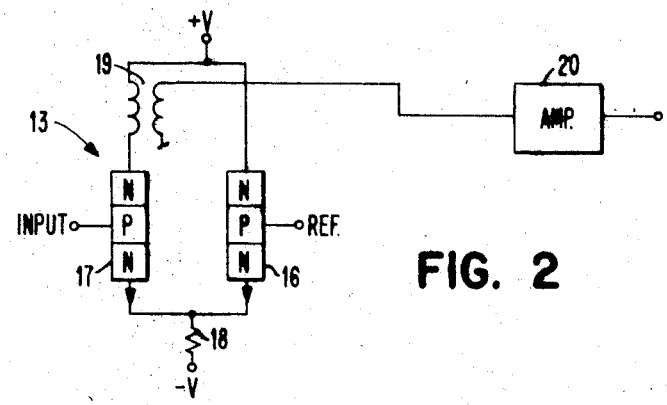
FIG. 2 is a circuit diagram of a discriminator that may be used in conjunction with the invention shown in FIG. 1.

Discriminator circuits for performing the detection function are well known. An example of a suitable circuit for the elapsed time application is shown in FIG. 2. In the absence of any input signal, transistor 16 is conducting and transistor 17 is cut off. Upon the occurrence of an input signal of rising potential, transistor 17 will turn on raising the voltage sufficiently at resistor 18 to reverse bias transistor 16 causing it to turn off. Initial conductance through the primary winding of transformer 19 produces a pulse of short duration in the secondary winding which is further amplified at 20. When the input potential decreases and falls below the reference voltage level, transistor 16 will again start to conduct. In the elapsed time situation being described, a discriminator is connected to both the start and stop terminals of the circuit under test so that only the discriminator signals indicating the voltage rise of a test pulse are used to control the subsequent circuitry.

Referring again to FIG. 1, discriminator 13 is responsive to the initiation of the test pulse and is connected to the ON input terminal of a conventional bistable trigger 25, and discriminator 14, responsive to the arrival of the test pulse at terminal 12, is connected to the OFF input terminal of the trigger. The trigger will thus be turned on when the test pulse is applied at terminal 11 and off when the pulse arrives later at output terminal 12. The time during which the trigger is on represents the test circuit propagation delay or the elapsed time.

The description thus far has been of a situation in which time delay is the condition to be measured. A signal representing that condition has been generated for which a meaningful value can be assigned.

Figure 3:
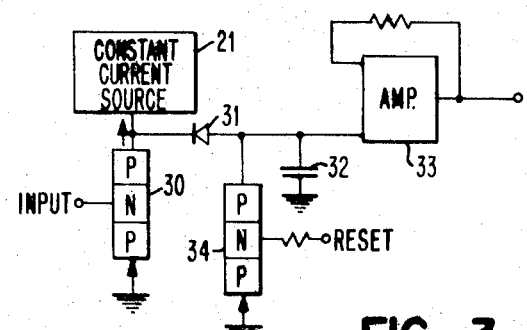
FIG. 3 is a circuit diagram of one example of a condition sensor that may be used in the selection apparatus.

The elapsed time signal is converted into a proportional analog signal by sensors 26, 27 and 28 commonly connected to the output of trigger 25. These sensors respond simultaneously to the trigger output and are each conditioned, during the time the trigger is on, to charge a storage capacitor and provide an output signal which is a function of the elapsed time. An example of a suitable sensor circuit is shown in FIG. 3. Transistor 30 is turned off by the signal from trigger 25 so that diode 31 is forward-biased and capacitor 32 starts to charge to a negative voltage from constant current source 21. Transistor 34 is off at this time. Charging continues until either the trigger is turned off or the amplifier saturates. The voltage level of the stored charge is the analog signal representing the time the trigger 25 is on, if the capacitor was still in the linear charging range when the trigger turned off.

When transistor 30 is turned back on, diode 31 is reverse-biased and prevents capacitor 32 from discharging immediately enabling interrogation of the stored charge. Depending on electrical size, component quality, and voltage levels involved, capacitor 32 can hold its output voltage within 0.1 percent for 1 second. Prior to each measurement, however, a negative reset pulse is applied to the base resistor of reset transistor 34. The negative pulse will turn on transistor 34 and allow capacitor 32 to discharge to a predetermined voltage in preparation for a subsequent measurement. The base resistor serves to equalize base currents in the event more than one base is being driven as in FIG. 1.

In order to cover a wider range of signal propagation delay, additional sensors similar to that of FIG. 3 are used which respond as different functions of the elapsed time. The charging rate or degree of response of each sensor is varied by altering component values so that each sensor can cover a different length of time delay. For example, sensor 26 may cover the range from 0 to 10 nanoseconds (ns.), sensor 27 may cover 0 to 100 ns., and sensor 28 may cover 0 to 1000 ns. Component values in each sensor would be correspondingly altered so that the range of time covered by each sensor would occur within the linear portion of the charging curve for the various capacitors. For convenience, it is desirable that each sensor output vary between fixed, common voltages such as between 0 to 10 volts, for example. The common voltage output range is not required, however, since the analog-to-digital converter can be modified to accept a range covering all sensors.

Figure 4:
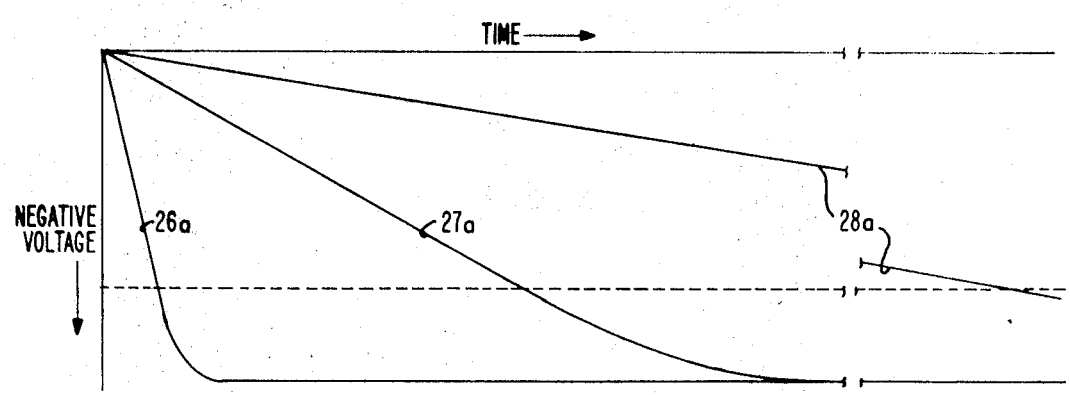
FIG. 4 is a diagram showing the response curves of a plurality of sensors operating in accordance with the invention.

An illustration of the time increment covered with each sensor is shown in FIG. 4 which compares the values of the negative-going charging voltage versus time for the sensors 26—28, when turned on by the trigger. The usable portions of the curves are those lying above the broken line. Signal values below the broken line are considered to be in the nonlinear or saturation region of the sensor and are blocked by a conventional threshold detector. When the sensor at FIG. 3 has been turned off by the trigger, its individual amplifier circuit 33 maintains the cutoff value of the ramp voltage through a feedback loop so that interrogation of the sensor value can occur at a time subsequent to the actual measurement of the propagation delay for the circuit under test.

Each of the sensors 26 28 of FIG. 1 is connected to its own threshold detector and chopper transistor circuit. For example, sensor 26 is connected to detector 35 and the chopper circuit 36. Sensor 27 is connected to threshold detector 37 and chopper circuit 38, and sensor 28 is connected to threshold detector 39 and chopper circuit 40. One, two or all of the sensors may be below or above the selected cutoff value chosen as the saturation point. Therefore, the subsequent circuits for each of these sensors are logically interconnected to cover the conditions when a sensor is or is not above the saturation or preselected end point. The threshold voltages of the detectors may be set to the value desired, but are preferably set at similar voltage values.

Figure 5:
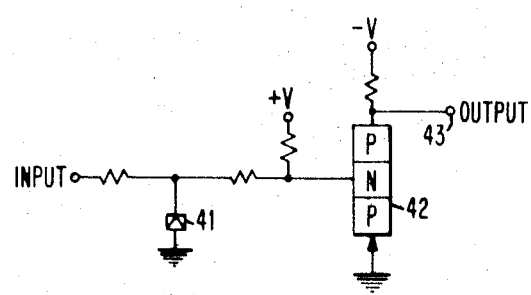
FIG. 5 is a diagram of a circuit that may be used as a threshold detector in the apparatus of FIG. 1.

An example of a suitable threshold detector circuit is shown in FIG. 5. As the signal at the input terminal from a sensor increases negatively, tunnel diode 41 becomes sufficiently forward biased so that it will turn on. This action lowers the base potential of transistor 42 sufficiently so that the transistor conducts. The potential at output terminal 43 changes from its binary 0 level to a more positive 1 level indicating that the preset threshold has been exceeded.

In the following description, the operation of the various circuit blocks will be described as operating in the binary logic of being in either the 0 or 1 states. 0 indicates that the output signal of the circuit is at the more negative of two levels, and the 1 state indicates the output is at the more positive level. When the output of sensor 26 is below the value preselected as the nonlinear or saturation voltage, the output signal of threshold detector 35 is at the 0 state and permits chopper transistor switch 36 to conduct. The chopper output potential is the same as the sensor signal level and is supplied through an amplifier 46 for conversion to a digital value to any suitable analog-to-digital converter 47. An example of such a converter is an Adage Voldicon, Model No. VR16-AD, available from Adage, Inc. of Boston, Mass. The output signal from detector 35 is supplied as a control input to inverting driver circuit 48. The driver circuit inverts the detector output to a 1 state, indicating operation of the range selection apparatus is presently in Range I.

An inverter circuit 49 is also connected to the output of detector 35 to produce a 1 level output while the detector is at the 0 level. The inverter output is applied through OR circuit 50 to inverting driver 51 for the next higher range. Driver 51 thus assumes a 0 output state, indicating Range II is not effective. Chopper transistor switch 38 is also blocked by the inverter signal. While sensor 26 is in the acceptable range, both sensors 27 and 28 are in the acceptable range so that their respective threshold detectors 37 and 38 are in the 0 state. However, inverter 52 is connected to detector 37 and provides a 1 input level through OR circuit 53 so that inverting driver 54 produces a 0 level output to indicate that Range III is also not effective. The signal from OR circuit 53 turns off chopper transistor switch 40. The outputs of inverting drivers 48, 51 and 54 thus indicate the scale being presently converted.

In the event sensor 26 exceeds its preselected end point, the 0 output of threshold detector 35 changes to a 1 level causing inverting driver 48 to, in turn, change to a 0 level rendering Range I ineffective. Chopper switch 36 is turned off by the 1 level from the detector so that the signal from sensor 26 is no longer converted. At the same time, inverter 49 also changes to a 0 level and removes the former inhibition on inverting driver 51. If the second sensor 27 is still within its acceptable signal range, threshold detector 37 remains in the 0 state. Inverting driver circuit 51 will then provide a 1 level output and chopper transistor switch 38 is turned on. This connects the signal from sensor 27 with amplifier 46 for conversion at 47. Range II is thus effective.

When sensor 27 exceeds its end point, its threshold detector 37 assumes a 1 output state which is applied through OR circuit 50 to turn off chopper switch 38 and change the output of inverting driver 51 to a 0 state, blocking conversion of Range II. Inverter 52 also changes to a 0 state so that the inhibition of inverting driver 54 through OR circuit 53 is removed. If the third sensor 37 is still within its acceptable output range, its threshold detector 39 is at the 0 level so that chopper switch 40 is turned on and driver 54 produces a 1 output level to indicate operation in Range III. The signal of sensor 28 is applied for conversion at 42.

In the event that sensor 28 or the last sensor in the series exceeds its end point, an Over Range indication occurs on line 55 at terminal 56. The output level on this line is merely the level from threshold detector 39 and will be at the 1 level only when the last sensor has exceeded its preselected range. When this occurs, chopper 40 will turn off and driver 54 will produce a 0 level because of the detector signal applied through OR 53.

From the foregoing description, it is seen that all sensors 26—28 are subjected to the same analog signal from trigger 25 and that all respond simultaneously during the time the trigger is on. Because of concurrent action, the threshold detectors will be on for those scales exceeded by the analog signal without having to sequentially test each sensor to determine its status as is usually done in automatic scaling devices. The speed of the automatic scaling system will be determined by the response time required for the analog-to-digital converter, since conversion can take place during the time that the analog input signal is being applied. If desired, the converter may be gated by a trigger circuit to operate only after the input to the sensors has been terminated. It will be apparent that sensors 26—28 may be eliminated and transducers such as those mentioned above can be substituted therefor. The transducers, of course, will have to be of the type which can withstand being overstressed or overdriven in the lower ranges in the event the analog input, such as displacement or pressure, becomes excessive.

Although the scales described have been shown as being each 10 times the capacity of the preceding scale, various scales according to choice can be incorporated in the automatic scaling apparatus. The scale indication lines in this instance can be connected to suitable circuits to alter the input to the converter if so desired to some fractional value such as in the instance of changing from a full scale deflection of 5 to a full scale deflection of 10 or some other proportion. The apparatus as disclosed lends itself very readily to computer applications since the data from converter 42 and Range lines I, II and III can be stored easily when in digital form for use at some later time depending upon computer availability.

While the invention has been particularly shown and described with reference to a preferred embodiment thereof, it will be understood by those skilled in the art that the foregoing and other changes in form and details may be made therein without departing from the spirit and scope of the invention.

We claim:

1. Apparatus for measuring duration of a time period defined by initiation and termination signals comprising:
   a plurality of devices each responsive to the initiation of said period for generating a substantially linear analog output signal of magnitude proportional to the passage of time within said period, each said output signal increasing at a different rate and producing a nonlinear output signal after a predetermined duration;
   means for converting a said analog output signal to a digital value proportional thereto;
   circuit means responsive to said output signals for selectively applying to said converting means the output signal of the one device whose output has the greatest magnitude and still bears a linear relation to said time period duration.

2. Apparatus as described in claim 1 wherein said devices each include a capacitor charged by a constant current source upon the occurrence of said initiation signal.

3. Apparatus for selecting one of a plurality of range scales for measurement of a variable quantity comprising, in combination:
   a plurality of devices each responsive for simultaneously producing analog output signals each having a varying value which is a function of the magnitude of a predetermined characteristic of said input signal, the value range of each said device being a different function of said input signal and having an end point value beyond which said output signal is no longer acceptable as a function of said input signal;
   means for converting to a digital representation an analog output signal supplied thereto;
   means connected with said devices and said converting means for selectively applying to said converting means the output signal of the said device whose output is closest to but not exceeding the respective end point; and
   detection means for rendering ineffective the output signal from one to all of said devices as each exceeds said end point value.

4. Apparatus as described in claim 3 wherein said selectively applying means includes means for blocking from said converting means the said output signals of all other said devices still below said end points while said detection means renders ineffective those devices above said end points.

5. Apparatus as described in claim 3 further including means for indicating the device having its output connected to said converting means and the condition when none of said devices are so connected.

PO-1050
(5/69)

UNITED STATES PATENT OFFICE
CERTIFICATE OF CORRECTION

Patent No. 3,577,076   Dated   May 4, 1971

Inventor(s) James E. Frushour, Ernest H. Millham and James E. Ort

It is certified that error appears in the above-identified patent and that said Letters Patent are hereby corrected as shown below:

The inventor's name "Earnest H. Millham" should read --Ernest H. Millham--.

In the claims, Claim 3, column 6, line 10, after "responsive" insert --to a common simultaneous initiation signal and a common simultaneous termination signal--.

Signed and sealed this 31st day of August 1971.

(SEAL)
Attest:

EDWARD M. FLETCHER, JR.
Attesting Officer

ROBERT GOTTSCHALK
Acting Commissioner of Pat